US005911192A

United States Patent [19]
Yap

[11] Patent Number: 5,911,192
[45] Date of Patent: Jun. 15, 1999

[54] PRODUCT IDENTIFICATION MARKER CONFIGURED AS AN INDICATOR PLATE FOR STORAGE TANKS UNDER GROUND AND ABOVE GROUND

[76] Inventor: Antonio deLeon Yap, P.O. Box 540, Pacifica, Calif. 94044

[21] Appl. No.: 08/138,456

[22] Filed: Oct. 15, 1993

[51] Int. Cl.$^6$ .................................................... G01D 21/00

[52] U.S. Cl. ............................................ 116/209; 116/200

[58] Field of Search .................................... 116/200, 209, 116/DIG. 16, 309, 317, 318, 306, 307, 325; 40/565, 612; 404/9, 25; 52/103, 104; 49/463; 210/257.1; 206/459.5; 141/94; 428/542.2, 542.8, 543; D23/203, 260, 266; D9/435, 436, 452, 454

[56] References Cited

U.S. PATENT DOCUMENTS

| | | | |
|---|---|---|---|
| D. 184,243 | 1/1959 | Sherman et al. | D23/260 |
| 3,758,999 | 9/1973 | Matvey | 52/103 |
| 3,908,055 | 9/1975 | Susuki et al. | 404/9 |
| 4,685,824 | 8/1987 | Eigenmann | 404/9 |
| 4,738,060 | 4/1988 | Marthaler et al. | 52/103 |
| 4,915,055 | 4/1990 | Ptashinski | 116/209 |
| 4,965,115 | 10/1990 | Cimillo | 428/131 |
| 5,056,454 | 10/1991 | Turner | 116/209 |
| 5,101,755 | 4/1992 | Barrett | 116/209 |
| 5,420,797 | 5/1995 | Burns | 364/479 |

FOREIGN PATENT DOCUMENTS

| | | | |
|---|---|---|---|
| 173219 | 2/1935 | Switzerland | 404/9 |

*Primary Examiner*—Diego Gutierrez
*Assistant Examiner*—Andrew Hirschfeld
*Attorney, Agent, or Firm*—Bernhard Kreten

[57] ABSTRACT

An indicator plate is provided which is embedded in the ground adjacent an inlet to a storage tank. The indicator plate is formed from materials which can support vehicular traffic directly thereupon without degradation of indicia located upon a top surface of the indicator plate. The indicator plate is formed from two separate molds. A first mold forms indicators. These indicators are then placed within a second mold which is then filled with fluid material in a manner which allows the indicators to be exposed through a top surface of the plate after the material hardens. A bolt is also placed within the material before hardening for anchoring the plate to the ground adjacent the inlet to the storage tank.

9 Claims, 8 Drawing Sheets

PRODUCT IDENTIFICATION MARKER CONFIGURED AS AN INDICATOR PLATE FOR STORAGE TANKS UNDER GROUND AND ABOVE GROUND

FIELD OF THE INVENTION

The following invention relates to labels, indicator plates and other indicia constructed to be embedded permanently in the ground. More specifically, this invention relates to indicator plates for location near an inlet to a service station storage tank, the indicator plate identifying the contents of an adjacent storage tank and capable of supporting repeated traffic loads.

BACKGROUND OF THE INVENTION

Storage tanks are known in the art which are buried underground and which have inlets which extend up to the ground surface. These storage tanks are often used in automotive service stations and other environments. Often these storage tanks are emptied and refilled on a regular basis and it is advantageous that the inlets be clearly marked as to the contents of the storage tank they are associated with. For instance, it is highly undesirable for different types of fuels to be mixed together in the same storage tank. If inlets to the storage tanks are not clearly marked, it is possible that service station personnel or fuel delivery personnel would mistakenly put the wrong fluid into the storage tank. This is especially the case where multiple different storage tanks are located near each other such as in the service station environment.

Additionally, the ground above the storage tanks are often located in high vehicle traffic areas. Accordingly, any indicator plates must be capable of supporting vehicle loads and maintain their indicating ability even after repeated traffic has passed thereover. Indicia such as decals and paint have shown to be unreliable in the long term because repeated traffic loads and weather have abraded the indicia off of the indicator plates.

Thus, a need exists for an indicator plate which is durable enough to withstand traffic loads and yet maintain clearly an indicia correlative to the fluid within the associated storage tank.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PATENT NO. | ISSUE DATE |
|---|---|---|
| Neblett | 3,134,184 | May 26, 1964 |
| Stitcha | 3,936,207 | February 3, 1976 |
| Villard | 4,907,361 | March 13, 1990 |
| Turner | 5,056,454 | October 15, 1991 |

The patent to Turner teaches the use of an utility locator which is embedded in the ground and exhibits information about the character and location of utility facilities nearby. The invention of this application is distinguishable from Turner in that, inter alia, it is configured to withstand repeated vehicular traffic.

The remainder of the prior art listed above, but not particularly distinguished, diverge even more starkly from the present invention than the patent to Turner.

SUMMARY OF THE INVENTION

The storage tank indicator plate is essentially a round disc which is securely embedded in the ground adjacent an inlet to a storage tank. The disc includes a top surface which has an indicator thereon which corresponds to a fluid contained within the storage tank.

The disc includes a bottom surface opposite from the top surface which has a bolt extending therefrom which anchors the plate to the ground. A recess can be provided in the ground which positions the top surface flush with the surface of the ground. The indicia on the top surface is a plurality of solid indicator masses having a significant depth and embedded within the disc so that only a top surface of each of the indicators is exposed on the top surface of the disc. By making the indicators of a solid mass of significant depth rather than a mere decal or coating, the indicators continue to function even after a significant portion of the top surface has worn away through the impact of repeated traffic and other environmental conditions. The indicators can be configured as any one of a variety of visually distinct forms. The indicators are formed of a different color than the top surface of the disc so that the indicators stand out against the background provided by the top surface of the disc.

The indicator disc is made by providing a plate mold and an indicator mold which can each be filled with a fluid substance which hardens under appropriate conditions. The indicator mold is utilized to mold a plurality of indicators in a desired form. Once these indicators have hardened, they are removed from the mold and placed within the plate mold and fluid material forming the disc is poured around the indicators.

Once the disc material has hardened, the indicators are embedded within the disc with top walls thereof coplanar with the top surface of the disc for ready viewing from above the top surface. The molds can include peg holes which form the indicators with pegs and which support the indicators to prevent movement during hardening of the disc material. An indicator support can also be provided which holds the indicators down against a floor of the plate mold ensuring that the top wall of each indicator is coplanar with the top surface of the disc.

One form of the indicator support includes a circular plate with support assemblies extending downward therefrom for each of the indicators. The support assemblies include springs thereon which have a free end which holds the indicators against the floor of the plate mold. Once the disc material begins to harden, the indicator support can be removed without concern over migration of the indicators.

A bolt is provided either within the indicator mold during hardening of certain of the indicators or within the plate mold during hardening of the disc material. In either case, a head of the bolt extends from a bottom surface of the plate after the disc material hardens allowing the head of the bolt to be fastened into the ground such as by placing within cementitious material and preventing the disc from being displaced from the ground adjacent the storage tank inlet.

OBJECTS OF THE INVENTION

Accordingly, it is a primary object of the present invention to provide an indicator plate having a top surface bearing indicia as to the contents of an adjacently located storage tank.

Another object of the present invention is to provide an indicator plate which can support vehicular traffic thereon.

Another object of the present invention is to provide an indicator plate which continues to maintain indicating ability even after a top surface of the indicator plate has worn away.

Another further object of the present invention is to provide an indicator plate which is easily manufactured from readily available materials.

Another further object of the present invention is to provide an indicator plate which is not susceptible to corrosion due to adverse environmental conditions.

Another further object of the present invention is to provide an indicator plate which resists degradation when exposed to corrosive materials.

Another further object of the present invention is to provide an indicator plate which is securely attachable to the ground.

Another further object of the present invention is to provide a method of manufacturing an indicator plate which is easily practiced in a low cost, efficient manner.

Viewed from a first vantage point, it is an object of the present invention to provide a storage tank label adjacent an inlet of the storage tank for directing an user of the inlet as to an identity of contents within the storage tank, the inlet and the label located on a horizontal ground surface supporting vehicular traffic thereon, the label comprised of a molded primary mass of solid material including a horizontal top surface and a side surface which conforms to a depression in the ground surface, the primary mass including means to anchor to the ground surface, and indicator means embedded within the primary mass and including a top wall substantially coplanar with the top surface of the primary mass; whereby the indicator means is exposed for viewing from above the top surface.

Viewed from a second vantage point, it is an object of the present invention to provide a method for making an indicator plate, the indicator plate having a primary mass of material with a planar top surface and a plurality of indicator masses embedded within the primary mass, each indicator mass having a planar top wall oriented coplanar with the top surface of the primary mass, the method including forming an indicator mass mold to have a plurality of recesses therein, each recess including a planar floor, placing fluid indicator mass material into the indicator mold, allowing the indicator masses to harden into a solid, removing the indicator masses from the indicator mold, forming a primary mass mold to have a recess including a planar floor, placing a plurality of the indicator masses in the primary mass mold with a planar wall thereof defining a top wall oriented adjacent the planar floor, placing fluid primary mass material into the primary mass mold, allowing the primary mass to harden into a solid, and removing the primary mass and indicator masses embedded therein from the primary mass mold.

Viewed from a third vantage point, it is an object of the present invention to provide an indicator plate manufacturing system for manufacturing indicator plates to be embedded on a vehicular traffic bearing surface without the indicator plates losing their indicating ability, the system comprised of a plate mold including a recess with a floor therein complemental to a top surface to be exhibited by the plate, an indicator mold including a plurality of recesses, each recess having a shape complemental to a shape of an indicator to be embedded within the plate, and means to prevent translation of the indicators within the plate mold.

These and other objects will be made manifest when considering the following detailed specification when taken in conjunction with the appended drawing figures.

DESCRIPTION OF PREFERRED EMBODIMENTS

Figure 1A:
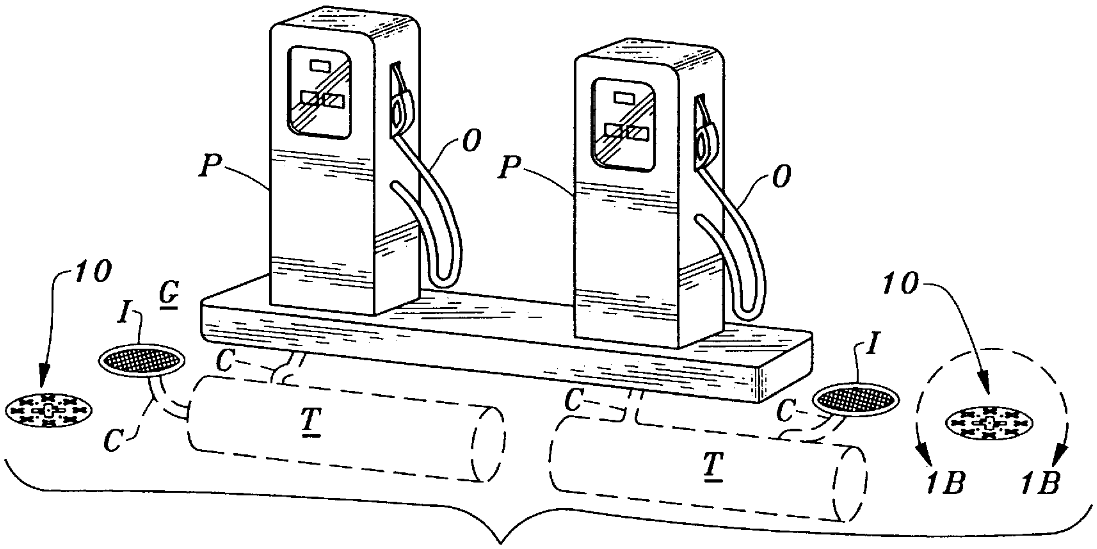
FIG. 1A is a perspective view of a fluid pump and associated storage tanks and inlets along with the device of this invention located proximate thereto.
Figure 1B:
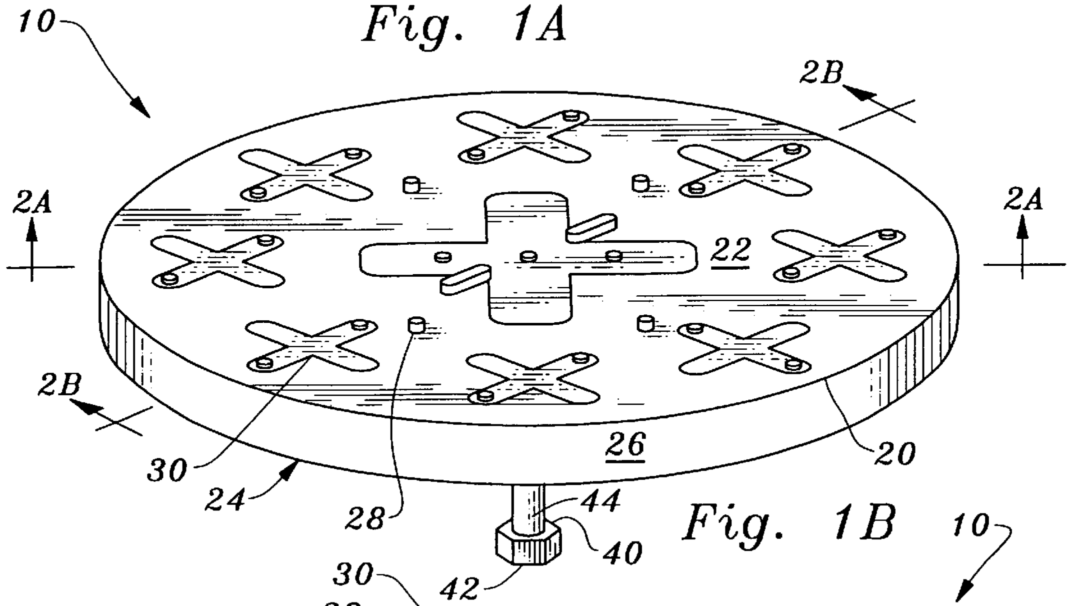
FIG. 1B is a perspective view of a portion of that which is shown in FIG. 1A taken along line 1B—1B of FIG. 1A.
Figure 2A:
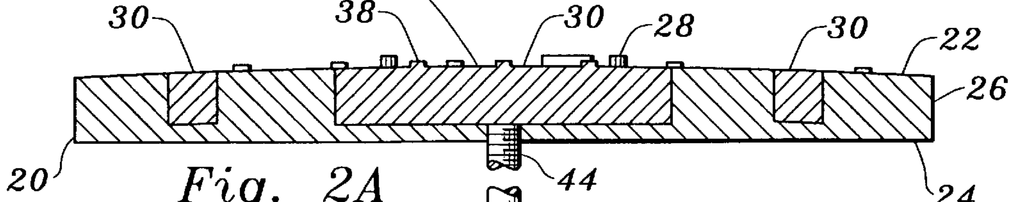
FIG. 2A is a sectional view of that which is shown in FIG. 1B taken along line 2A—2A of FIG. 1B.
Figure 2B:
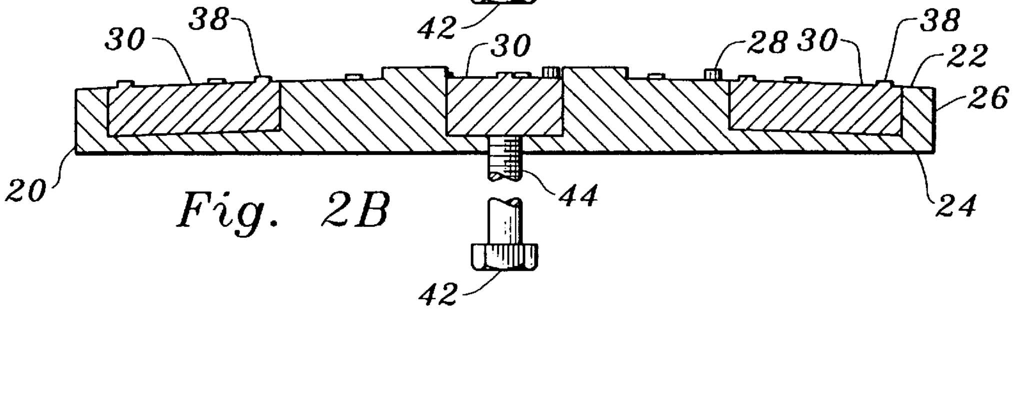
FIG. 2B is a sectional view of that which is shown in FIG. 1B taken along line 2B—2B of FIG. 1B.

Considering the drawings, wherein like reference numerals denote like parts throughout the various drawing figures, reference numeral 10 is directed to an indicator plate which is embedded in the ground G near a storage tank inlet I connected to a storage tank T (FIG. 1A). The indicator plate 10 is located adjacent the inlet I and provides an indication as to what type of fluid is contained within the storage tank T connected to the adjacent inlet I.

Figure 4A:
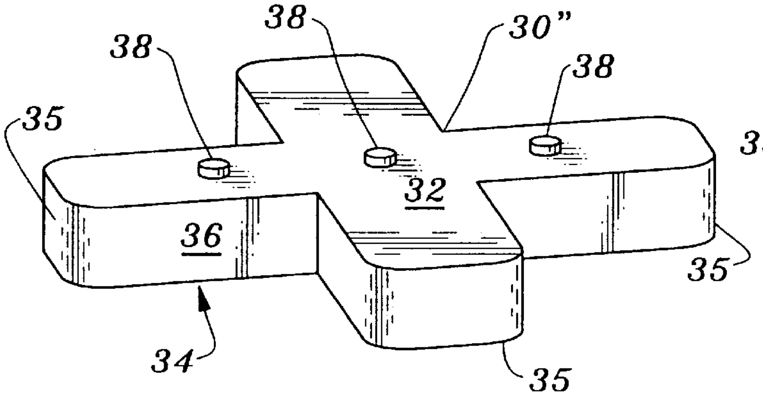
FIG. 4A is a perspective view of a large indicator of this invention.
Figure 4B:
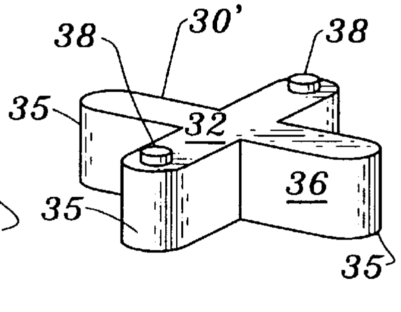
FIG. 4B is a perspective view of a small indicator of this invention.

In essence, and referring to FIGS. 1B through 2B, the indicator plate 10 is a solid disc shaped construct including a disc 20 having indicators 30 embedded therein. A bolt 40 extends downwardly therefrom. The disc 20 includes a top surface 22, a bottom surface 24 and a side surface 26. Each indicator 30 (see FIGS. 4A and 4B) includes a top wall 32 substantially coplanar with a top surface 22 of the disc 20, a bottom wall 34 embedded within the disc 20 and a side wall 36 between the top wall 32 and the bottom wall 34. The indicators 30 include legs 35 which extend from a center of each indicator 30. Some indicators 30' are of a smaller size and some indicators 30" are of a larger size.

Figure 7:
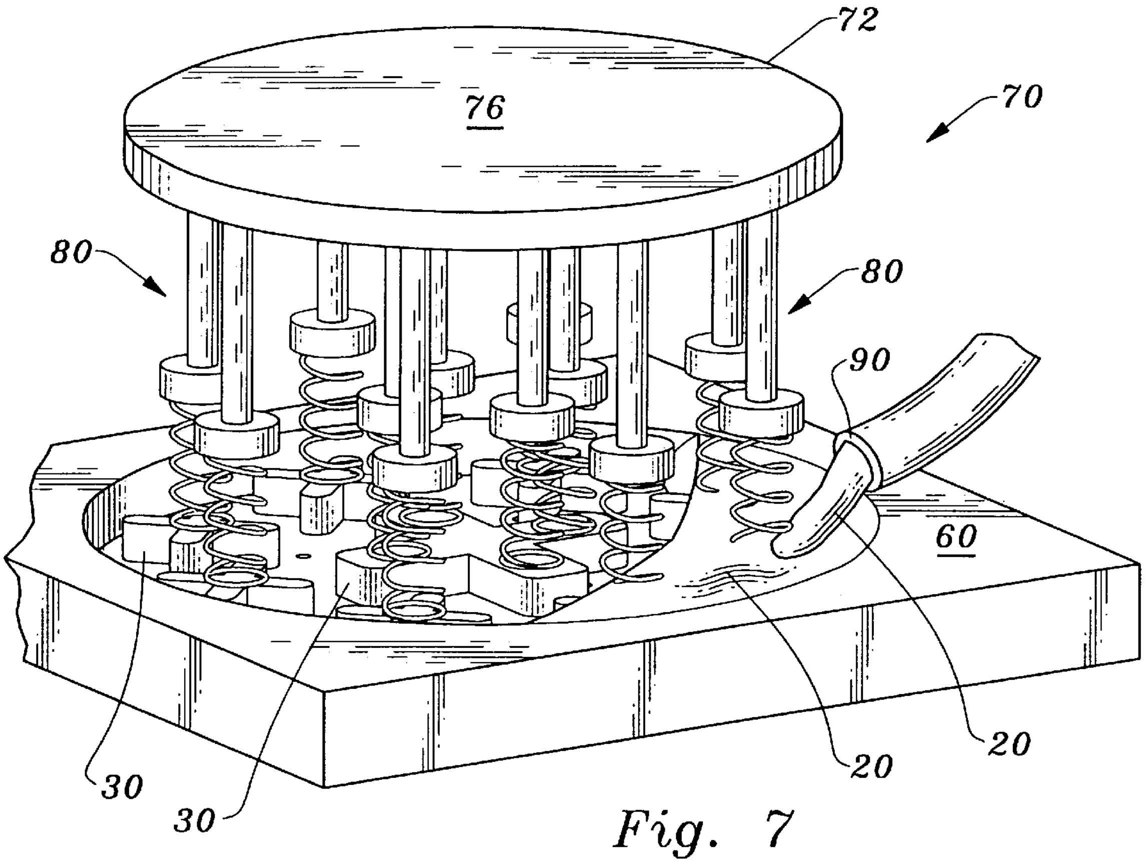
FIG. 7 is a perspective view of that which is shown in FIGS. 5 and 6 together with fluid disc material being poured into the plate mold.
Figure 8:
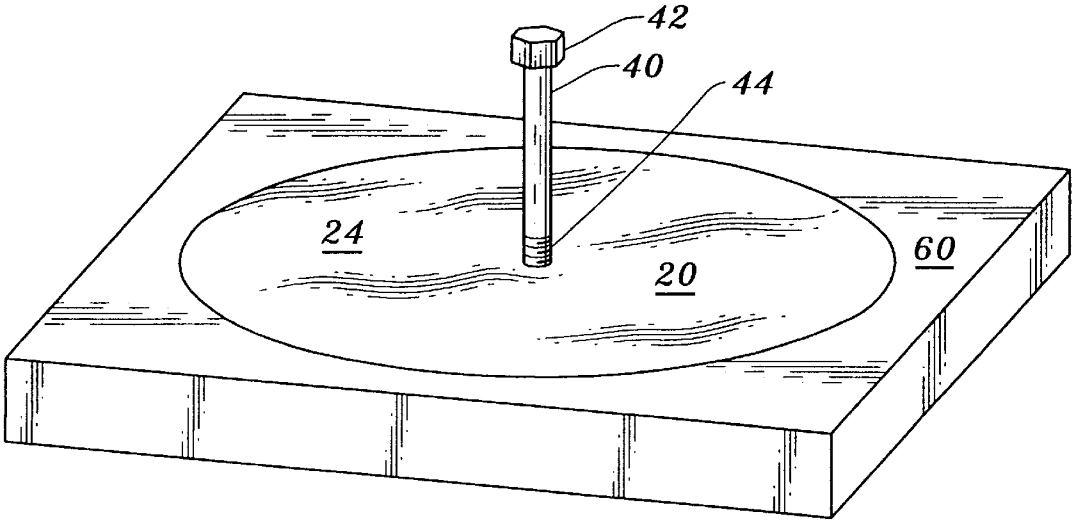
FIG. 8 is a perspective view of this invention with an attachment bolt extending from a bottom surface thereof during hardening of the disc material.
Figure 9:
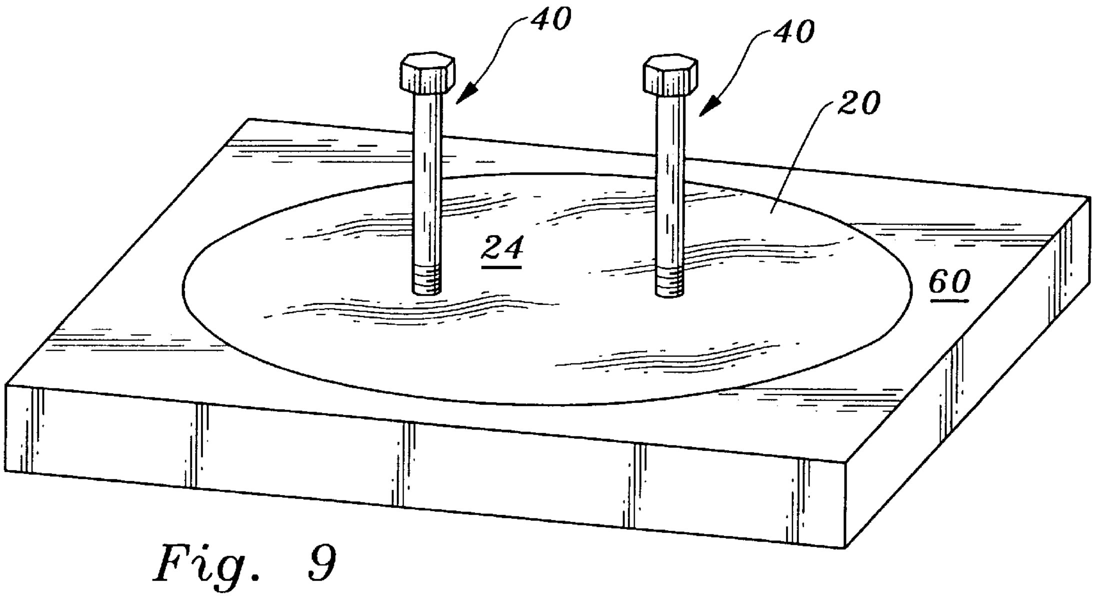
FIG. 9 is a perspective view of an alternative embodiment of that which is shown in FIG. 8.
Figure 10:
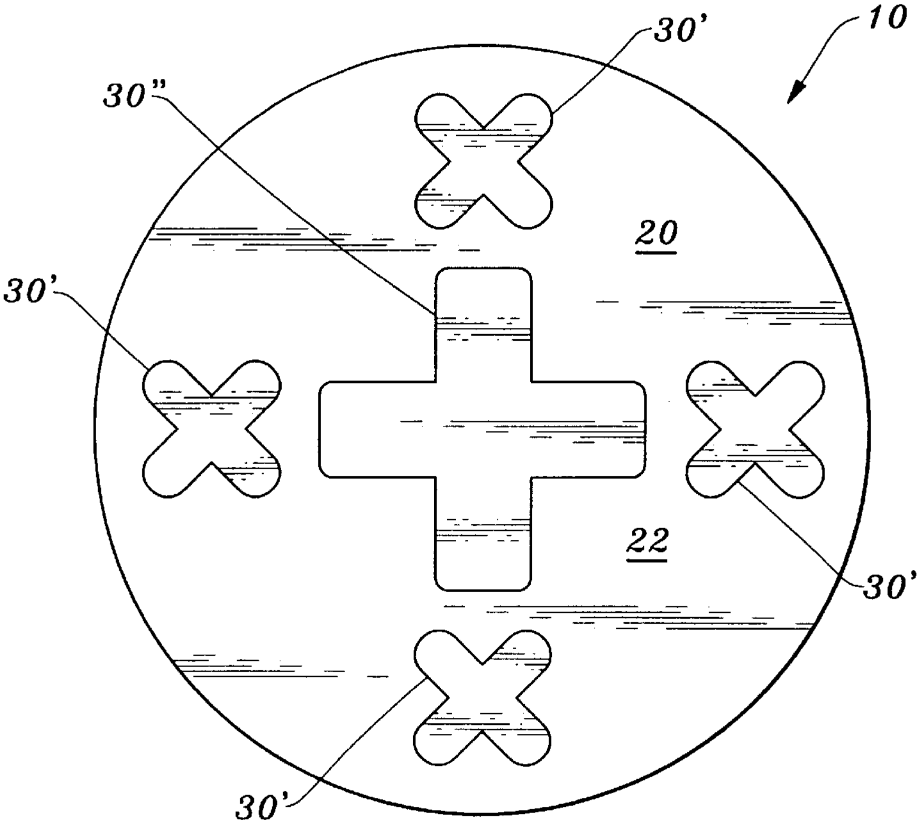
FIG. 10 is a top plan view of the device of this invention revealing one pattern of indicator arrangement within the indicator plate.

The indicator plate 10 is formed by utilizing an indicator mold 50 (FIG. 3) to form the indicators 30 and a plate mold 60 (FIG. 5) to form the disc 20. The indicators 30 are first formed and hardened within the indicator mold 50 and then placed within the plate mold 60. Disc material is then poured into the plate mold 60 surrounding the indicators 30 and allowed to hardened forming the indicator plate 10 (FIG. 7). An indicator support 70 can be used to hold the indicators 30 in place while the disc material hardens.

Figure 3:
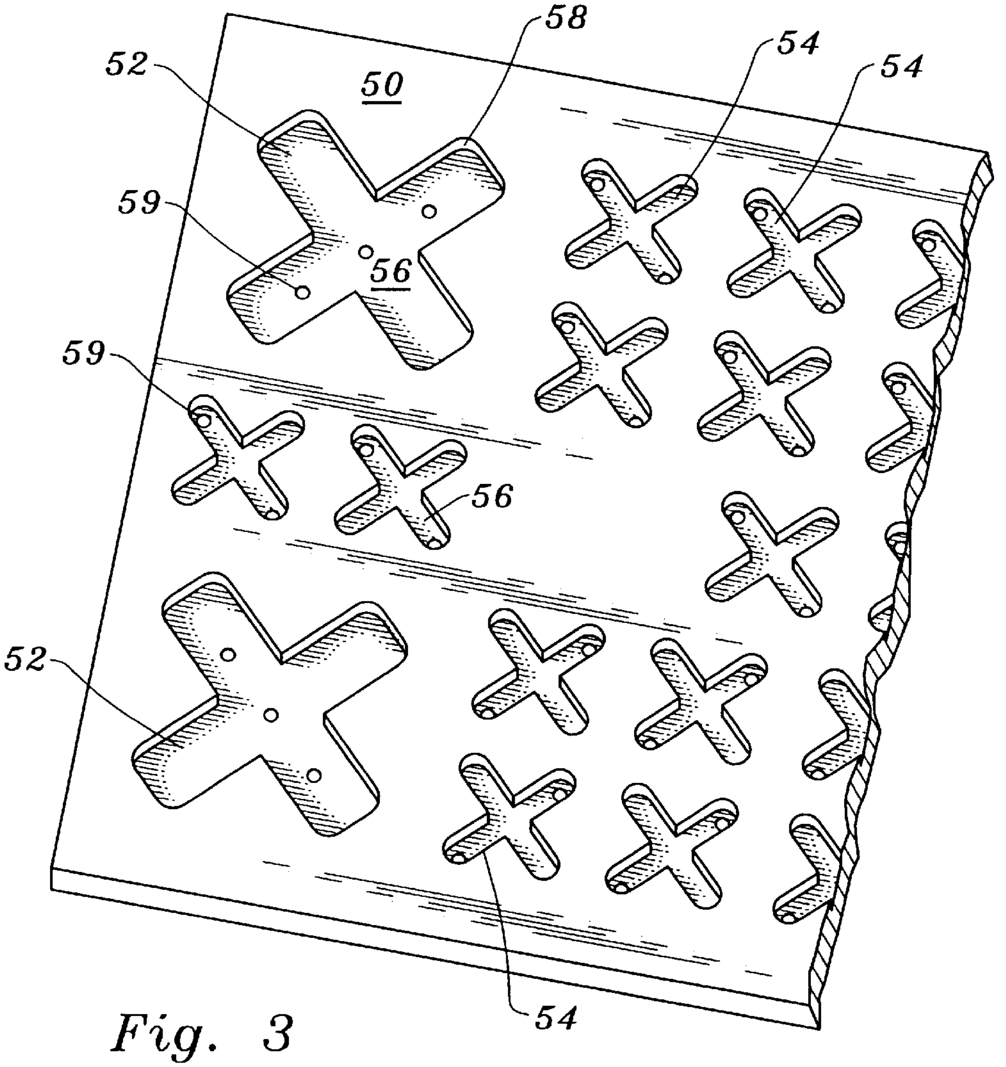
FIG. 3 is a perspective view of an indicator mold of this invention.
Figure 5:
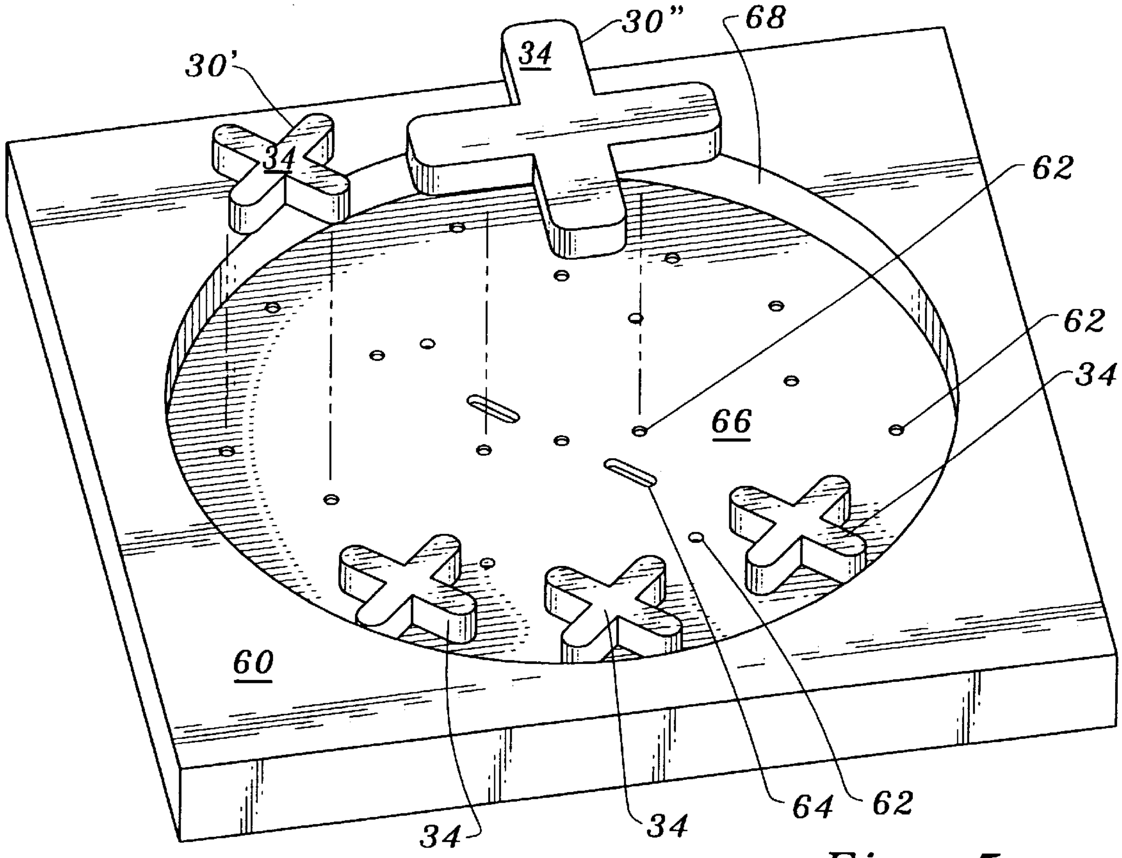
FIG. 5 is a perspective view of a plate mold of this invention with indicators in position within the plate mold.
Figure 6:
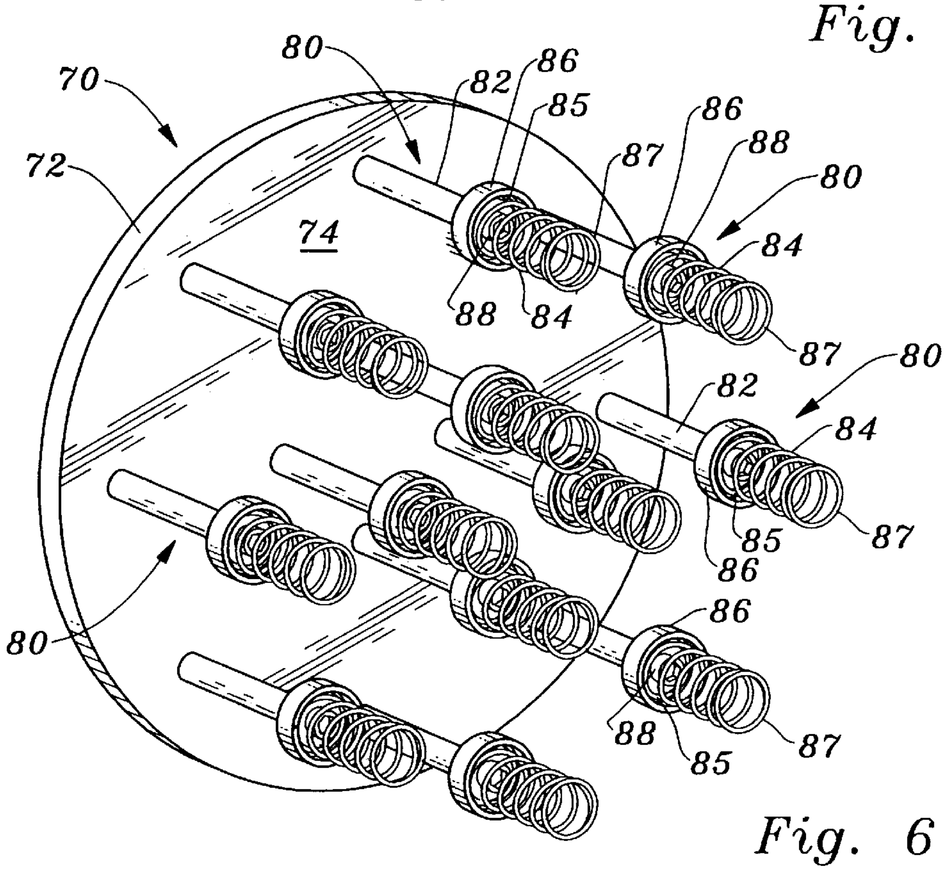
FIG. 6 is a perspective view of an indicator support which holds the indicators within the plate mold.

More specifically, and referring to FIGS. 3 through 5, details of the indicators 30 within the indicator plate 10 are shown and described. Each indicator 30', 30" includes a top wall 32 which is substantially planar and spaced from a bottom wall 34. A side wall 36 is interposed between the top wall 32 and bottom wall 34. The indicators 30 are preferably formed in a “cross” with a plurality of legs 35 extending from a center of the indicator 30. The top wall 32 includes a plurality of pegs 38 extending upwardly therefrom. The pegs 38 are preferably cylindrical in shape and extend perpendicular to the top wall 32.

The indicators 30 are formed by placing an initially fluid material within an indicator mold 50. The indicator mold 50 is a surface having a plurality of large recesses 52 and small recesses 54. Each recess 52, 54 includes a floor 56 on a bottom thereof which is substantially planar. Sides 58 of each recess 52, 54 extend down to the floor 56. A plurality of peg recesses 59 are formed in the floor 56 which have a shape conforming to a shape of the pegs 38 of the indicators 30. When fluid material is poured into the indicators mold 50 and allowed to harden, the indicators 30 are formed as a consistent solid indicator mass. The mold can then be reused to make additional indicators.

Referring now to FIGS. 1B through 2B and 5 through 7, details of the disc 20 are shown and described. The disc 20 is a substantially cylindrical construct which includes a substantially planar top surface 22 spaced from a bottom surface 24 with a cylindrical side surface 26 interposed therebetween. A plurality of posts 28 extend up from the top surface 22 substantially perpendicularly therefrom. The disc 20 includes a plurality of indicators 30 embedded therein which extend from the top surface 22 toward the bottom surface 24, but not all the way through to the bottom surface 24. The disc 20 thus is a primary mass of solid material with the indicator masses embedded therein.

The disc 20 is formed within a plate mold 60 (FIG. 5). The plate mold 60 includes a surface having a recess therein which conforms to a form of the disc 20. Specifically, the plate mold 60 includes a circular floor 66 surrounded by a cylindrical side 68. A plurality of peg holes 62 and post holes 64 are located on the floor 66. In forming the disc 20, initially indicators 30 are placed such that their pegs 38 rest within peg holes 62 on the floor 66 of the plate mold 60. The peg holes 62 hold the pegs 38 of the indicators 30 from translating parallel to the surface of the floor 66. Once the indicators 30 are arranged as desired, fluid disc material 20 is poured into the plate mold 60 (FIG. 7) and allowed to harden within the disc 20 with the indicators 30 embedded therein.

Preferably, an indicator support 70 is provided which prevents the indicators 30 from “floating” within the plate mold 60 or being displaced out of position within the plate mold 60. The indicator support 70 includes a circular plate 72 having a bottom surface 74 (FIG. 6) and a top surface 76 (FIG. 7). The bottom surface 74 supports a plurality of support assemblies 80 extending therefrom.

Each support assembly 80 includes a shaft 82 extending perpendicularly from the bottom surface 74 and includes a spring 84 attached thereto with a spring retainer 86. An attached end 85 of the spring 84 is held to the shaft 82 through the spring retainer 86 and a bolt 88 holding the spring retainer 86 to the shaft 82. A free end 87 of the spring 84 is then free to contact the indicators 30 within the plate mold 60.

Preferably, the indicator support 70 includes support assemblies 80 located where the indicators 30 are provided within the plate mold 60. The indicator support 70 is placed over the indicators 30 which are within the plate mold 60 while the fluid disc material 20 is poured into the plate mold 60 through the fluid outlet 90. This pouring process is thus prevented from dislodging the indicators 30 from the peg holes 62 within the floor 66 of the plate mold 60. Once the disc material 20 has begun to harden, the indicator support 70 can be removed allowing the disc material 20 to harden without leaving an indication that the indicator support 70 was ever utilized. Once the disc material 20 has hardened, the disc 20 is removed from the plate mold 60 and exhibits the top wall 32 of the indicators 30 coplanar with the top surface 22 of the disc 20.

A bolt 40 preferably extends from the bottom surface 24 of the disc 20. The bolt 40 includes a threaded shaft 44 extending from the bottom surface 24 with a head 42 at an end of the thread shaft 44 distant from the bottom surface 24. Preferably, the bolt 40 is initially placed within one of the large recesses 52 of the indicator mold 50 while the indicator material 30 is poured into the indicator mold 50. The bolt 40 is thus provided extending from the large indicator 30". When the large indicator 30" is subsequently placed within the plate mold 60 and the disc material 20 is poured into the plate mold 60, the bolt 40 extends through both the large indicator 30" and the disc material 20 to be exposed from the bottom surface 24 and from the disc 20.

Materials of the disc 20 and indicators 30 are preferably such that the bolt 40 can be threaded out of the indicator 30 and disc 20 after hardening of the indicator 30 and disc 20. This provides a threaded recess which can removably receive the bolt 40. The bolt 40 acts as an anchor when the indicator plate 10 is located within the ground G which prevents the indicator plate 10 from being removed from the ground G. In an alternative embodiment, two bolts 40 are provided extending from the bottom surface 24 of the disc 20. In this configuration, the bolts do not pass through an indicator 30", but rather are placed within the plate mold 60 during entry of the disc material 20 into the plate mold 60. In either case, the bolts 40 are utilized to anchor the indicator plate 10 to the ground G.

The indicators 30 are placed within the plate mold 60 in an arrangement which corresponds to a material to be contained within the storage tank adjacent the indicator plate 10. With the molds as shown in FIGS. 3 and 5, a variety of different patterns can be created for indicator 30 and disc 20 arrangement. Examples of these arrangements are shown in FIGS. 10 through 15. Preferably the indicators 30 are formed from a material which has a distinctly contrasting appearance compared to that of the disc 20. Thus, the indicators 30 stand out dramatically against the disc 20 background.

Figure 11:
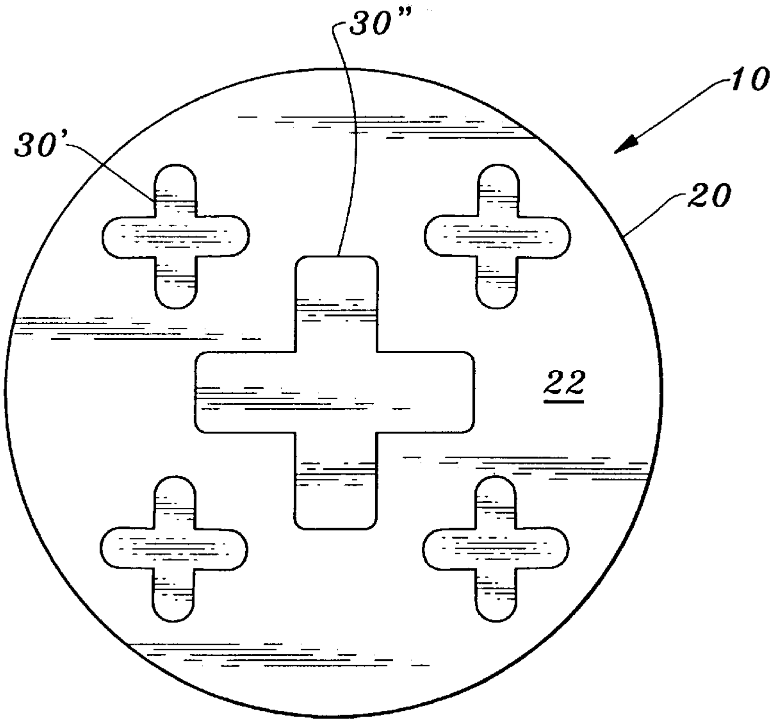
FIGS. 11 through 15 reveal alternative embodiments of that which is shown in FIG. 10 with the only difference being the unique relative arrangements of the indicators within the indicator plates.
Figure 12:
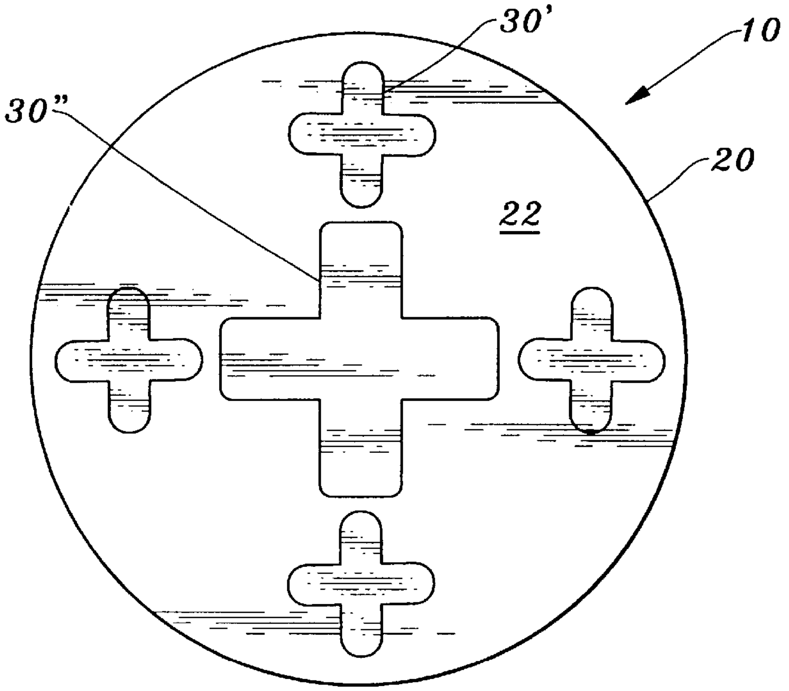

By utilizing a large indicator 30" and smaller indicators 30', the large indicator can be placed in a center of the disc 20 to provide a reference against which the arrangement of the smaller indicators 30' are arranged. For instance, in FIG. 10 the large indicator 30" appears as a cross while the smaller indicators 30' are arranged as X’s above, below and to the sides of the cross. In FIG. 11, the smaller indicators 30' are arranged as smaller crosses between the legs of the larger indicators 30". In FIG. 12, the smaller indicators 30' are arranged as crosses above, below and to the sides of the larger indicators 30".

Figure 13:
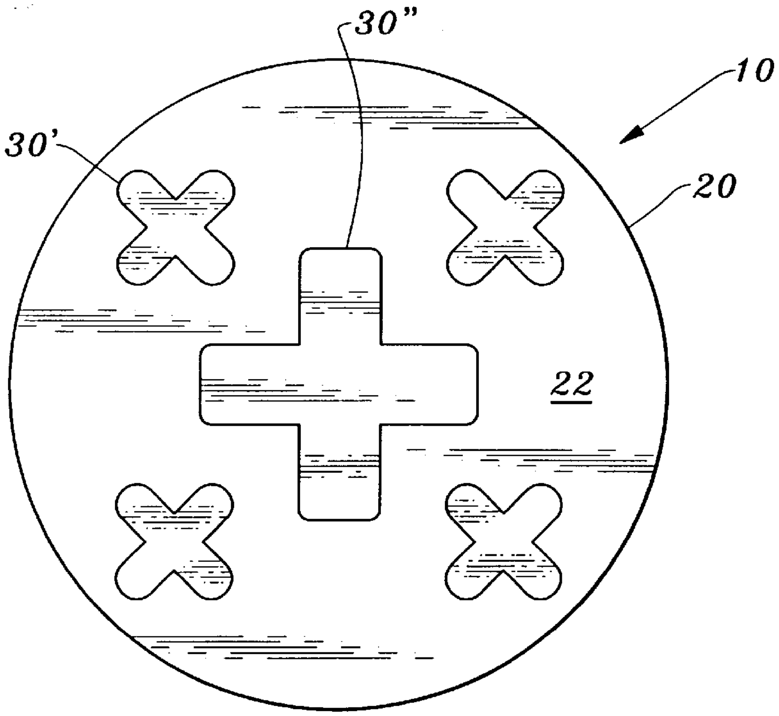
Figure 14:
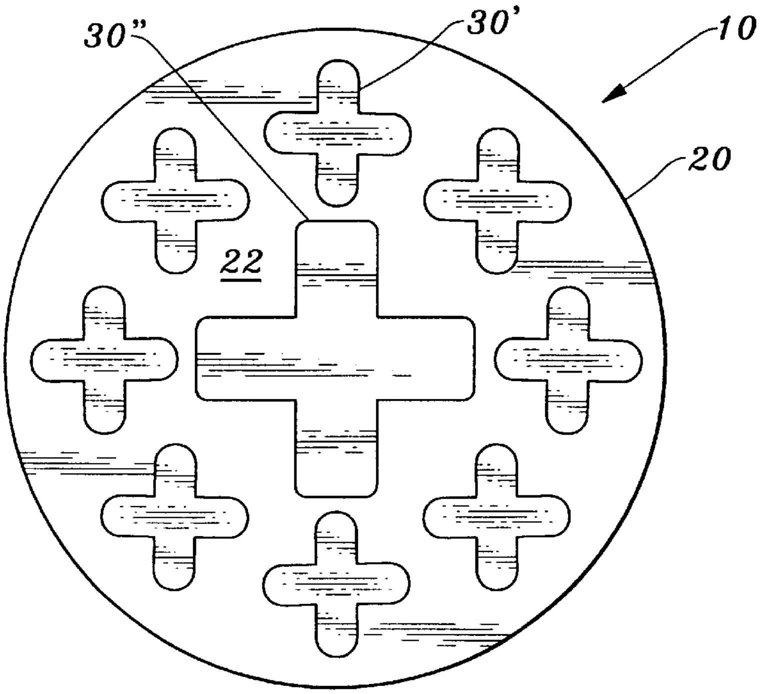
Figure 15:
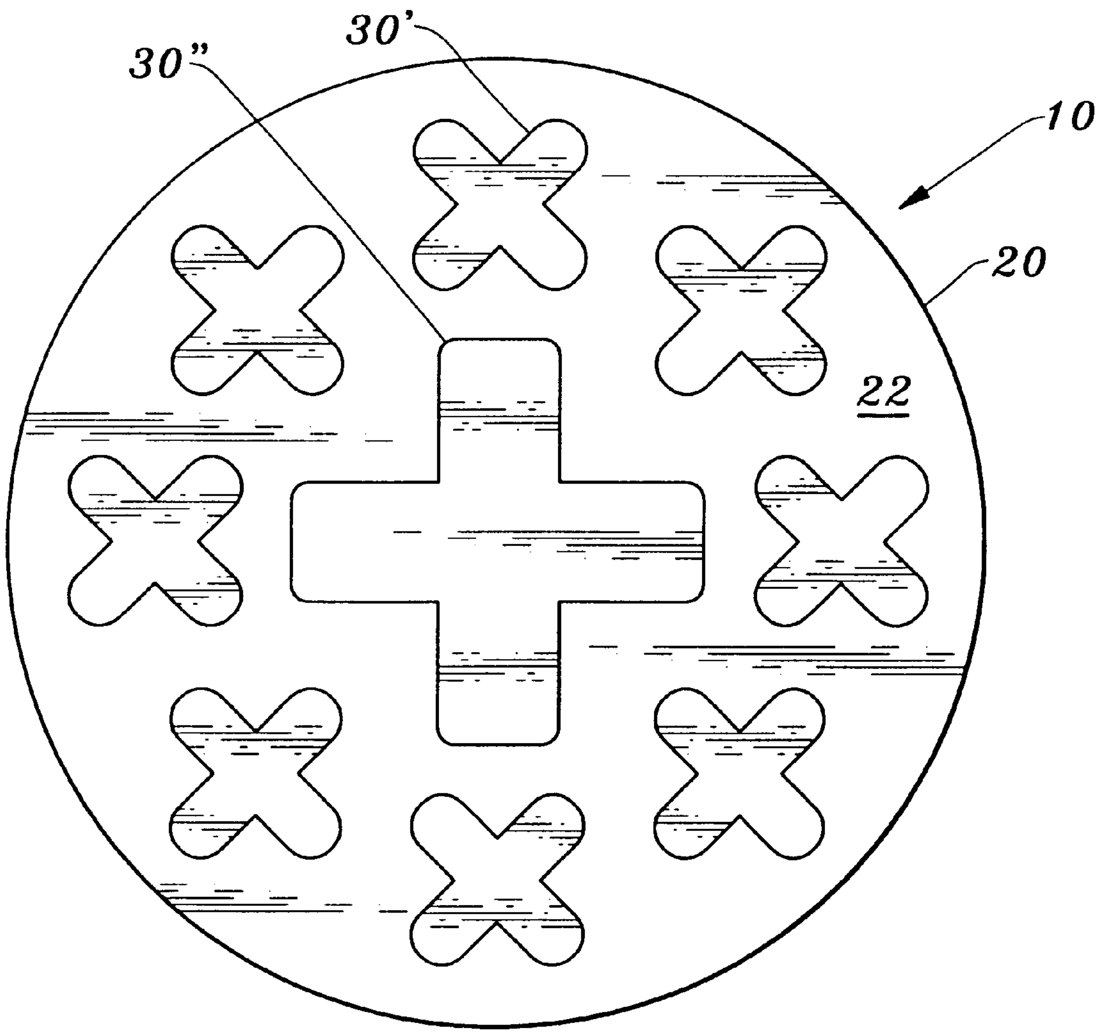

In FIG. 13, the smaller indicators 30' are arranged as X’s between the legs of the large indicators 30". In FIG. 14, small indicators 30' are arranged as crosses in eight positions surrounding the larger indicators 30". In FIG. 15, the smaller indicators are arranged as X’s surrounding the larger indicators 30". As is readily apparent, various other arrangements can be conceived even from the molds shown in FIGS. 3 and 5. In addition, the molds can be modified to provide a variety of different indicators.

By providing the indicators 30 with a thickness greater than half a thickness of the indicator plate 10, even if half of a thickness of the plate 10 is worn away from traffic, corrosive substances, harsh environmental conditions and other abrasive circumstances, the indicators 30 will continue to exhibit the desired pattern.

The post hole 64 provided within the plate mold 60 results in posts 28 being formed in the disc 20. The posts 28 along with the pegs 38 provide additional interruptions of the top surface 22 of the disc 20. This enhances traction and facilitates easier handling of the indicator plate 10 before its location within the ground G.

In use and operation, the indicator plate 10 is used in the following manner. Initially, a surface of the ground G surrounding a storage tank T is prepared for receiving the indicator plate 10 (FIG. 1A). The storage tank T includes conduits C leading to an outlet O of a pump P and leading to an inlet I. This preparation could include forming an appropriate hole to receive the indicator plate 10 or could be timed to coincide with the installation of the storage tank T itself or repaving in an area overlying the storage tank T. In the latter cases, the bolt 40 can be oriented extending down into the ground G to anchor the indicator plate 10 securely within the ground G.

Care is taken to select an appropriate indicator 30 pattern upon the indicator plate 10 which corresponds to the fluid contained within the storage tank. By making the pattern of indicators 30 rather general, not specific to a particular type of fluid within the storage tank T, changes to the contents within the storage tank T will not require replacement of the indicator plates 10. Rather, a user merely must carefully catalogue that the pattern of the indicator plate 10 now references a different fluid.

Should these plates 10 and indicators 30 become industry standards, the indicator will have the same significance in all environments. The indicators 30 and plates 10 could also be color keyed, i.e. red for high octane, white for 87/unleaded regular, blue for 89/unleaded regular, green for leaded regular, yellow for diesel.

Care should be taken to define that the indicator plate 10 corresponds to a specific fluid to be input within the storage tank T. When service personnel arrive at a service station with a load of fluid fuel to be utilized in filling a storage tank T, the appropriate personnel are informed as to the correlation between the appearance of the indicator plate 10 which matches the fluid which is being delivered to the service station. In this way, mishaps associated with pouring the wrong fluid into the storage tank are deterred.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A storage tank label placed adjacent an inlet of an underground storage tank adapted to receive petroleum type products and including conduits extending from the tank to the inlet and an outlet, the outlet associated with a pump provided with means to dispense the petroleum product, the label unequivocally directing a user of the inlet as to an identity of contents within the storage tank, the inlet and said label both located on a surface supporting vehicular traffic thereon, said storage tank label comprising in combination:

a molded primary mass of solid material including a horizontal top surface and a side surface which conforms to a depression in the surface, said primary mass including means to anchor to the surface placed adjacent an inlet cover which obturates a conduit that leads to the petroleum storage tank, and indicator means embedded within said primary mass and including a top wall substantially coplanar with said top surface of said primary mass;

said indicator means and said primary mass configured to withstand repeated vehicular traffic while clearly maintaining the identity of the contents of the storage tank, whereby said indicator means is exposed for viewing from above said top surface.

2. The device of claim 1 wherein said indicator means is a solid mass of material exhibiting a distinct visual appearance from that exhibited by said primary mass, said indicator mass and said primary mass each exhibiting a consistent distinct visual characteristic throughout each said mass such that abrasion of material constituting said primary mass and said indicator mass from said horizontal top surface and said top wall does not modify a visual appearance of said label.

3. The device of claim 2 wherein said indicator means includes a plurality of separate masses arranged in a pattern, said pattern corresponding to an unequivocal identification of petroleum type products within the storage tank adjacent to said storage tank label.

4. The device of claim 3 wherein said primary mass and said plurality of indicator masses are each formed from initially fluid material which can conform to a contour of a mold and then harden into a distinct solid shape, whereby said plurality of indicator masses can be embedded within said primary mass after hardening of said plurality of indicator masses into a solid but before hardening of said primary mass into a solid.

5. The device of claim 4 wherein said anchor means includes a structure with a greatest horizontal surface area at one end of said structure and an opposite end of said structure embedded within a bottom surface of said label, whereby when said label is located on the surface, the anchor means extends down into the surface with the greatest area portion of the anchor means distant from the bottom surface of the label preventing the label from migrating upwards away from the surface.

6. The device of claim 5 wherein said primary mass of said label is shaped as a solid disc having a cylindrical side surface interposed between said top surface and said bottom surface.

7. The device of claim 6 wherein said anchor means is a bolt including a threaded shaft extending from said bottom surface of said label, and a head at an end of said threaded shaft distant from said bottom surface, said head having a horizontal area greater than a cross-sectional area of said threaded shaft.

8. The device of claim 7 wherein each of said plurality of indicator masses is crossed-shaped with a plurality of legs extending from a central portion thereof, said plurality of indicator masses having distinct sizes with a central largest indicator located near a geometric center of said label and a plurality of smaller indicator masses surrounding said larger indicator mass, each said smaller indicator mass oriented with said legs arranged in a unique pattern with respect to said larger indicator mass, whereby the orientation of the smaller indicator masses with respect to the larger indicator mass can be correlated with the contents of the storage tank providing an indicator of the contents within the storage tank.

9. The device of claim 8 wherein said plurality of indicator masses include cylindrical pegs extending upwardly from said top wall thereof, said pegs providing a means to support said indicator masses during formation of said label.

* * * * *